(No Model.)
H. BARKER.
METHOD OF OBTAINING GLUTEN AND STARCH.
No. 399,727. Patented Mar. 19, 1889.
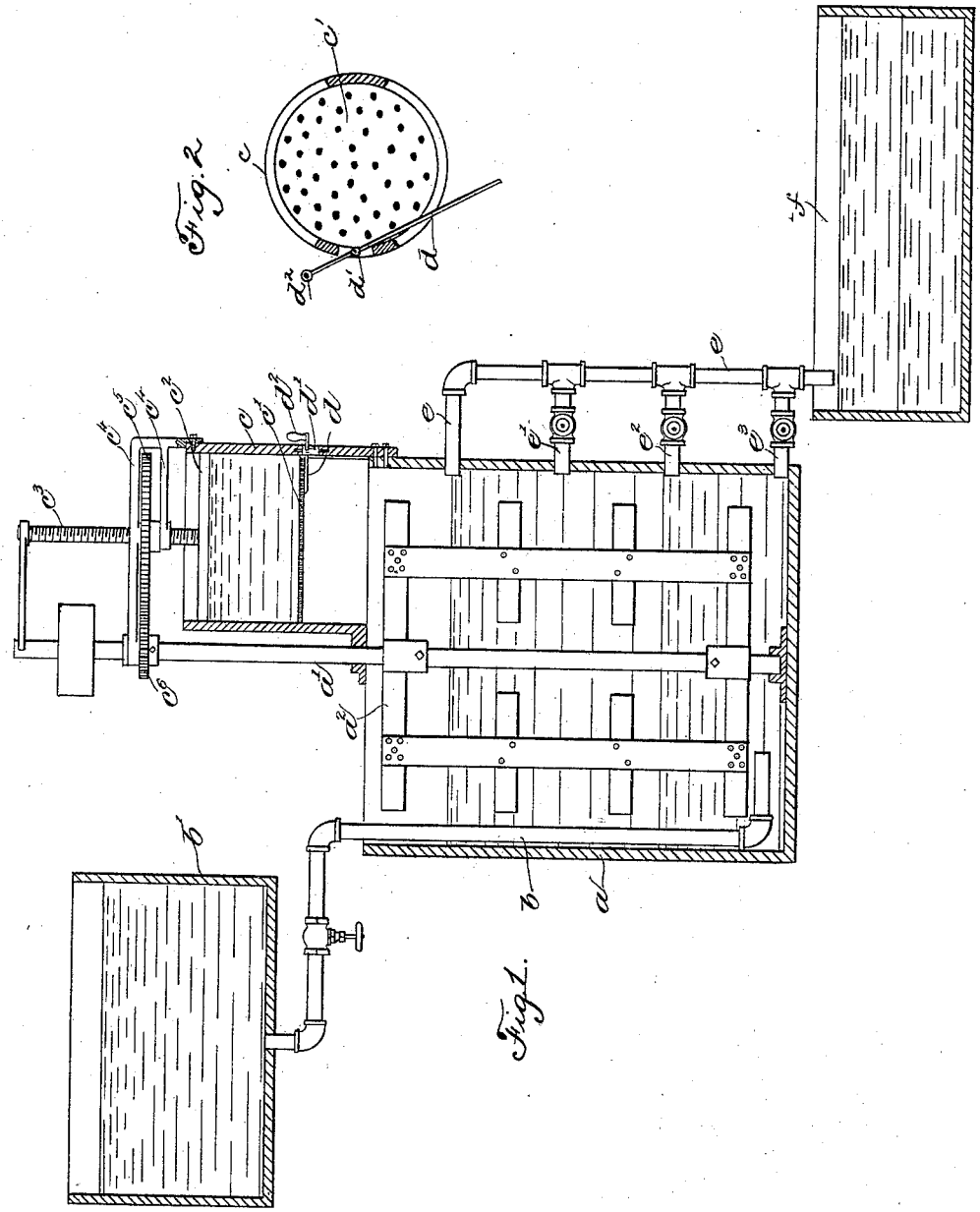
Witnesses.
Fred. S. Greenleaf
Frederick L. Emery
Inventor.
Herman Barker.
By Crosby Gregory
Attys.

UNITED STATES PATENT OFFICE.

HERMAN BARKER, OF SOMERVILLE, MASSACHUSETTS.

METHOD OF OBTAINING GLUTEN AND STARCH.

SPECIFICATION forming part of Letters Patent No. 399,727, dated March 19, 1889.

Application filed June 25, 1888. Serial No. 278,163. (No model.)

*To all whom it may concern:*

Be it known that I, HERMAN BARKER, of Somerville, county of Middlesex, State of Massachusetts, have invented an Improvement in the Method of Obtaining Gluten and Starch, of which the following description, in connection with the accompanying drawings, is a specification, like letters on the drawings representing like parts.

This invention has for its object the provision of a novel method or process for the manufacture of gluten and starch.

In accordance with this invention a cereal, preferably wheat, is granulated or pulverized to form a flour. Water is added to the granulated or pulverized cereal to form a semi-fluid or pasty mass. The pasty or semi-fluid material is then divided or separated into innumerable or independent bars, threads, or pieces, such as may be formed by forcing the material through a perforated plate, and thereafter cutting the depending bars or threads into short lengths. The independent pieces are dropped into a suitable liquid, as water or carbonic acid, with which they are agitated until the liquid sets free the starch and gluten, after which they are collected by subsidence.

In carrying out this invention a receptacle of suitable size is employed, in which is placed an agitator, and a pipe leads into the said receptacle to supply or fill the same with water, it being conducted from a suitable tank. Another vessel or receptable is employed having a perforated bottom plate, in which the pasty or semi-fluid granular material is placed, and a plunger is provided for forcing the said material through the perforations of the bottom plate. A suitable cutter is provided to cut off the bars or pieces of material depending from the under side of the perforated plate, that they may fall into the liquid-containing receptacle to be agitated. As the independent pieces of pasty material are commingled with the water or other liquid by the slow-moving agitator, the starch and gluten are set free, the gluten settling to the bottom of the receptacle, while the starch remains commingled with the liquid by agitation, and it is drawn off into another receptacle, where the starch separates from the said liquid by subsidence.

Figure 1 shows in vertical section one form of apparatus designed to carry out the invention herein to be described; and Fig. 2, a detail of the cutter, to be described.

The receptacle $a$, of any suitable size or shape, contains within it a spindle, $a'$, to which is fixed an agitator, $a^2$, composed, for instance, of suitable bars and braces. The spindle $a'$ will be revolved in any usual or suitable manner to slowly rotate the agitator $a^2$. A pipe, $b$, extends downwardly into the receptacle $a$, terminating at the lower end thereof, the said pipe being connected with the water or other liquid-supply tank $b'$ and conducting the liquid therefrom to the bottom of the receptacle $a$, which point in practice has been deemed best; but the water may be admitted at any other point.

A receptacle, $c$, is placed above the receptacle $a$, it having a perforated bottom plate, $c'$, and containing a plunger, $c^2$, mounted on the end of a screw rod or shaft, $c^3$. The screw rod or shaft $c^3$ has its bearings in guides $c^4$, and a toothed wheel, $c^5$, is mounted upon the said screw-rod, said wheel $c^5$ being engaged by a toothed wheel, $c^6$, fixed to the spindle $a'$.

The granular material, suitably commingled with water or other liquid, preferably cold water, to form a pasty mass, is placed in the receptacle $c$ and forced downward by the plunger $c^2$ through the perforations in plate $c'$.

A wire or rod, $d$, attached to a post, $d'$, adapted to be rotated by a crank-arm, $d^2$, is designed to be swung just beneath the receptacle $c$, across the under face of the perforated plate $c'$, to thereby cut off the material issuing from the perforations of the plate. The pieces thus cut off, and which will be preferably of about one inch in length, fall into the receptacle $a$, and are commingled with the water or other liquid contained therein by the slowly-moving agitator. When the operation is commenced, the receptacle $a$ will contain but a small quantity of water, and as the operation continues it will gradually become filled until the liquid contained in the receptacle $a$ arrives at the height indicated in the drawings, at which point the said receptacle is provided with an overflow-pipe, $e$, which leads into and conducts the liquid material from the top of the receptacle $a$ into the receptacle $f$. As the operation is carried on, agitation being given to the liquid and independent pieces of the pasty material, (which, as aforesaid, will preferably be granulated or pulverized wheat,) the gluten will be set free and will settle at the bottom of the receptacle $a$ by specific gravity, while the starch, which is also set free by the liquid material, as the gluten, will remain commingled with the liquid material by agitation, and will therefore be conducted through the pipe $e$ into the receptacle $f$, in which receptacle it will also settle by its specific gravity.

Other pipes, as $e'$ $e^2$ $e^3$, lead from the receptacle $a$, which serve to conduct the material to the pipe $e$, each of which has a valve that may be opened, when desired, to entirely drain the receptacle $a$. The gluten thus obtained has been found to be very pure and of excellent quality, and the starch also obtained of excellent quality, as well as being a very large percentage of the material used, as the waste in the process herein described is very little.

I claim—

1. The method herein described of obtaining gluten from cereals, which consists in adding water to the granulated or pulverized cereal to form a semi-fluid or pasty mass, dividing the said pasty mass into small independent pieces or particles, disintegrating the said independent pieces in liquid to set free the gluten, and thereafter collecting the gluten by subsidence.

2. The method herein described of obtaining starch from cereals, which consists in adding water to the granulated or pulverized cereal to form a semi-fluid or pasty mass, dividing the said pasty mass into small independent pieces or particles, disintegrating the said independent pieces in liquid to set free the starch, and thereafter collecting the starch by subsidence.

In testimony whereof I have signed my name to this specification in the presence of two subscribing witnesses.

HERMAN BARKER.

Witnesses:
BERNICE J. NOYES,
FREDERICK L. EMERY.